United States Patent
Gwon et al.

(10) Patent No.: US 12,551,950 B2
(45) Date of Patent: Feb. 17, 2026

(54) HARD COATING FILM FOR CUTTING TOOL

(71) Applicant: KORLOY INC., Seoul (KR)

(72) Inventors: Jin-han Gwon, Cheongju-si (KR); Seung-su Ahn, Cheongju-si (KR); Je-hun Park, Cheongju-si (KR)

(73) Assignee: KORLOY INC., Seoul (KR)

( * ) Notice: Subject to any disclaimer, the term of this patent is extended or adjusted under 35 U.S.C. 154(b) by 373 days.

(21) Appl. No.: 18/033,626

(22) PCT Filed: Sep. 6, 2021

(86) PCT No.: PCT/KR2021/012023
§ 371 (c)(1),
(2) Date: Apr. 25, 2023

(87) PCT Pub. No.: WO2022/102929
PCT Pub. Date: May 19, 2022

(65) Prior Publication Data
US 2023/0398608 A1     Dec. 14, 2023

(30) Foreign Application Priority Data
Nov. 16, 2020   (KR) ........................ 10-2020-0152488

(51) Int. Cl.
*C23C 14/08*    (2006.01)
*B23B 27/14*    (2006.01)
(Continued)

(52) U.S. Cl.
CPC ........ *B23B 27/148* (2013.01); *C23C 14/0641* (2013.01); *C23C 14/081* (2013.01);
(Continued)

(58) Field of Classification Search
CPC ............ B23B 2224/08; B23B 2224/24; B23B 2224/28; B23B 2224/32; B23B 2224/36;
(Continued)

(56) References Cited

U.S. PATENT DOCUMENTS

| | | | | |
|---|---|---|---|---|
| 5,597,272 A | * | 1/1997 | Moriguchi | ............ C23C 30/005 407/120 |
| 2002/0051871 A1 | * | 5/2002 | Palmqvist | ............... C22C 1/051 428/209 |

(Continued)

FOREIGN PATENT DOCUMENTS

| | | |
|---|---|---|
| JP | 08-158052 | 6/1996 |
| JP | 2010115737 A * | 5/2010 |

(Continued)

OTHER PUBLICATIONS

Machine translation of JP 2010/115737 A.*
Machine translation of JP 2012/030308 A.*
Machine translation of JP 2012/223872 A.*

*Primary Examiner* — Z. Jim Yang
(74) *Attorney, Agent, or Firm* — LEX IP MEISTER, PLLC

(57) ABSTRACT

The present invention relates to a cutting tool composed of a hard base material, such as cemented carbide, cermet, ceramic, and cubic boron nitride, and a hard coating film formed on the hard base material. A hard coating film for a cutting tool according to the present invention is formed in a multi-layered structure on a base material of a cutting tool, wherein the hard coating film includes one or more layers of a coating film made of an oxide and one or more layers of a coating film made of a nitride, and is characterized in that the O/(O+N) ratio in an edge center of the cutting tool is lower than the O/(O+N) ratio in a region 100 μm or further away from the edge center in the entire hard coating film.

5 Claims, 1 Drawing Sheet

(51) Int. Cl.
  *C23C 14/06* (2006.01)
  *C23C 14/32* (2006.01)
  *C23C 14/35* (2006.01)
  *C23C 28/04* (2006.01)
  *C23C 30/00* (2006.01)

(52) U.S. Cl.
  CPC .............. *C23C 14/32* (2013.01); *C23C 14/35* (2013.01); *C23C 28/042* (2013.01); *C23C 30/005* (2013.01); *B23B 2224/24* (2013.01); *B23B 2228/105* (2013.01)

(58) Field of Classification Search
  CPC .......... B23B 2228/10; B23B 2228/105; B23B 2228/36; C23C 14/0641; C23C 14/0647; C23C 14/0652; C23C 14/0658; C23C 14/0664; C23C 14/0676; C23C 14/08; C23C 14/081; C23C 16/308; C23C 16/34; C23C 16/342; C23C 16/345; C23C 16/36; C23C 16/40; C23C 16/403; C23C 30/005; C23C 28/04–44; C04B 41/5062–5068; C04B 41/52; C04B 41/522; C04B 41/524; C04B 41/526; C04B 41/89
  See application file for complete search history.

(56) References Cited

U.S. PATENT DOCUMENTS

| | | | | |
|---|---|---|---|---|
| 2006/0019117 A1* | 1/2006 | Cedergren | .............. | C23C 16/00 428/701 |
| 2006/0029831 A1* | 2/2006 | Lindholm | .............. | B23B 27/141 427/248.1 |
| 2007/0134517 A1* | 6/2007 | Martensson | .......... | C23C 30/005 427/248.1 |
| 2007/0269610 A1* | 11/2007 | Fukui | .................. | C23C 14/0641 427/497 |
| 2008/0131218 A1* | 6/2008 | Omori | .................. | B23B 27/141 407/114 |
| 2008/0166527 A1* | 7/2008 | Lenander | .............. | B23B 27/141 427/249.19 |
| 2008/0260477 A1* | 10/2008 | Omori | .................. | B23B 27/141 407/119 |
| 2009/0003944 A1* | 1/2009 | Omori | .................. | B23B 27/143 407/119 |
| 2009/0004440 A1* | 1/2009 | Ban | ....................... | C23C 28/044 428/192 |
| 2009/0067938 A1* | 3/2009 | Omori | .................. | C23C 30/005 407/119 |
| 2009/0269150 A1* | 10/2009 | Omori | .................. | B23B 27/141 407/114 |
| 2012/0231227 A1* | 9/2012 | Kanaoka | ............... | C23C 30/005 428/172 |
| 2013/0017026 A1* | 1/2013 | Hasegawa | ............. | C23C 28/044 407/115 |
| 2013/0177361 A1* | 7/2013 | Waki | .................... | C23C 30/005 407/115 |
| 2015/0225840 A1* | 8/2015 | Andersson | ........... | C23C 14/021 204/192.16 |
| 2015/0273724 A1* | 10/2015 | Minami | ................ | C23C 28/042 428/141 |
| 2015/0298215 A1* | 10/2015 | Bjormander | .......... | C23C 28/044 407/115 |
| 2015/0328690 A1* | 11/2015 | Sakamoto | ........... | C23C 14/0664 407/115 |
| 2015/0336176 A1* | 11/2015 | Bjormander | .......... | C23C 16/403 407/115 |
| 2015/0343535 A1* | 12/2015 | Sakamoto | ........... | C23C 28/042 407/115 |
| 2016/0263659 A1* | 9/2016 | Takahashi | ............... | C23C 16/06 |
| 2017/0021434 A1* | 1/2017 | Kauper | ................... | B23B 51/02 |
| 2019/0176242 A1* | 6/2019 | Murakami | ............. | C23C 16/36 |
| 2020/0180037 A1* | 6/2020 | Kanaoka | ................. | B23G 5/06 |
| 2020/0261985 A1* | 8/2020 | Kubo | .................... | C23C 16/271 |
| 2020/0331071 A1* | 10/2020 | Yoshimura | ............ | C23C 30/005 |
| 2021/0237165 A1* | 8/2021 | Kido | ..................... | C23C 28/044 |
| 2023/0126815 A1* | 4/2023 | Sugawa | .................. | C23C 16/403 428/698 |
| 2024/0066605 A1* | 2/2024 | Kobayashi | .............. | C23C 16/36 |

FOREIGN PATENT DOCUMENTS

| | | | |
|---|---|---|---|
| JP | 2012-030308 | | 2/2012 |
| JP | 2012030308 A | * | 2/2012 |
| JP | 2012223872 A | * | 11/2012 |
| JP | 2016-187847 | | 11/2016 |
| KR | 10-2019-0028503 | | 3/2019 |
| KR | 10-2019-0081387 | | 7/2019 |

* cited by examiner

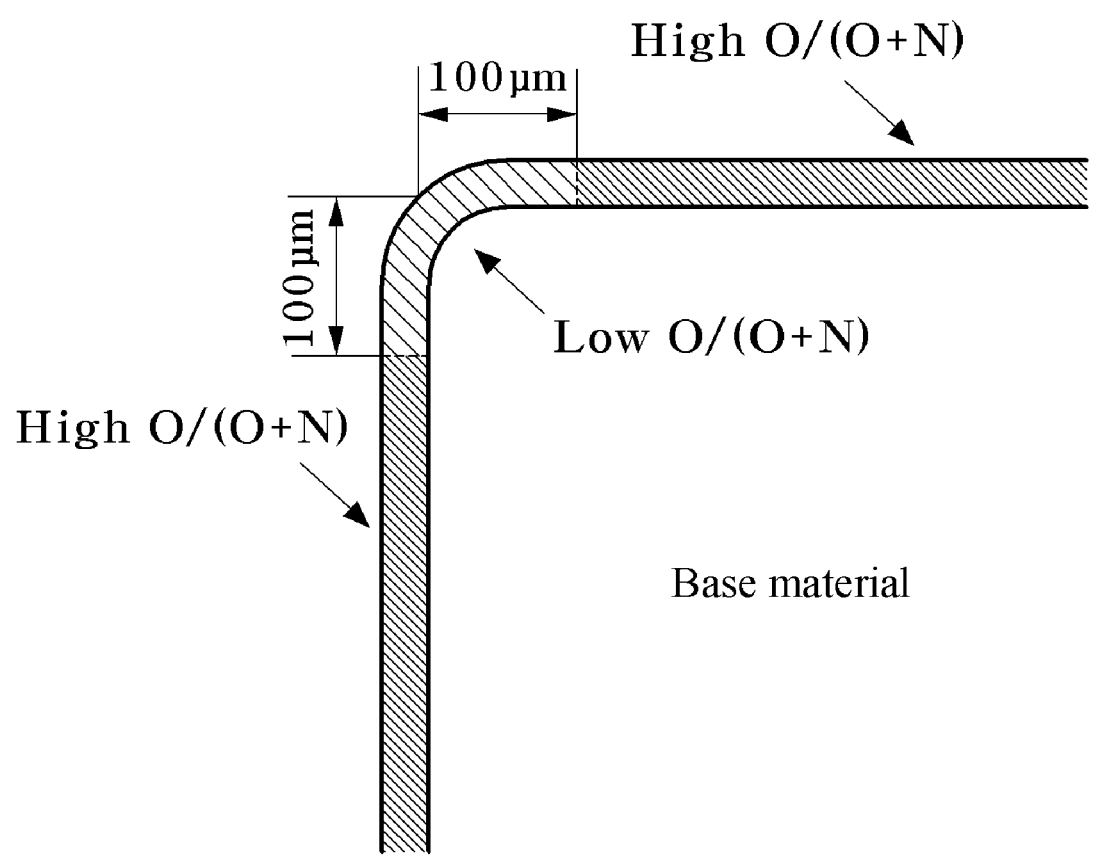

HARD COATING FILM FOR CUTTING TOOL

TECHNICAL FIELD

The present invention relates to a hard coating film formed on a hard base material, such as cemented carbide, cermet, ceramic, and cubic boron nitride (cBN) used in a cutting tool. More specifically, the present invention relates to a hard coating film which extends the lifespan of a cutting tool by controlling the content ratio of oxygen and nitrogen of the hard coating film to be different for each part of the cutting tool in the hard coating film composed of a multi-layered structure coating film including a nitride film and an oxide film.

BACKGROUND ART

An edge of a cutting tool is exposed to a high-temperature environment of about 1000° C. during high-speed machining of a high-hardness material, and is subjected to wear due to friction and oxidation caused by a contact with a workpiece, as well as a mechanical impact such as a crack. Therefore, it is essential for a cutting tool have adequate abrasion resistance and toughness.

In order to impart abrasion resistance and toughness required for a cutting tool as described above, on the surface of cemented carbide, which is generally used for a cutting tool, a hard coating film is formed through chemical vapor deposition (hereinafter referred to as 'CVD').

Such a hard coating film is composed of a single-layered or multi-layered non-oxide-based coating film (e.g., TiN, TiC, and TiCN), an oxide-based coating film having excellent oxidation resistance (e.g., $Al_2O_3$), or a mixed layer thereof, and examples of the non-oxide-based coating film include a carbide, a nitride, and a carbonitride of metal elements of Group 4, 5, and 6 of the Periodic Table, such as TiN, TiC, TiCN, etc., and examples of the oxide-based coating film include alpha-$Al_2O_3$ or gamma-$Al_2O_3$.

Meanwhile, cutting tools differ slightly in their roles and required physical properties depending on a part in contact with a material to be cut. For example, in general, a rake face is required of oxidation resistance, abrasion resistance, welding resistance, etc., an edge is required of oxidation resistance, heat-resistant crack resistance, delamination resistance, etc., and a flank face is required of abrasion resistance.

In order to satisfy the physical properties required differently for each part of a cutting tool to some extent, a multi-element thin film including various elements, a multi-layered structure thin film composed of different material-layers, or a post-processing technique have been applied, but these techniques have limitations in differentiating the physical properties for each part of the tool.

DISCLOSURE OF THE INVENTION

Technical Problem

The object of the present invention is to provide a hard coating film for a cutting tool which is capable of extending the lifespan of a tool by implementing physical properties which may be closer to physical properties required for each of an edge, a rake face, and a flank face by controlling the content ratio of oxygen and nitrogen to be different for each part to be formed in the hard coating film formed on a cutting tool.

Technical Solution

In order to achieve the above object, the present invention provides a cutting tool having a hard coating film, which is a hard coating layer formed in a multi-layered structure on a base material of the cutting tool, wherein the hard coating film includes one or more layers of a coating film made of an oxide and one or more layers of a coating film made of a nitride, and in the entire hard coating film, the O/(O+N) ratio in an edge center of the cutting tool is lower than the O/(O+N) ratio in a region 100 μm or further away from the edge center.

Advantageous Effects

In the case of a cutting tool to which a hard coating film according to the present invention is applied, oxidation resistance and welding resistance are improved due to an increase in the O/(O+N) ratio on a rake face or a flank face, and delamination resistance is improved due to a decrease in the O/(O+N) ratio in an edge portion.

BRIEF DESCRIPTION OF THE DRAWINGS

FIG. 1 schematically shows the structure of a hard coating film according to the present invention.

BEST MODE FOR CARRYING OUT THE INVENTION

Hereinafter, embodiments of the present invention will be described in detail with reference to the accompanying drawings.

However, the embodiments of the present invention illustrated below may be modified into other various forms, and the scope of the present invention is not limited to the embodiments described below. The embodiments of the present invention are provided to more fully describe the present invention to those skilled in the art.

A hard coating film for a cutting tool according to the present invention is formed in a multi-layered structure on a base material of a cutting tool, wherein the hard coating film includes one or more layers of a coating film made of an oxide and one or more layers of a coating film made of a nitride, and is characterized in that the O/(O+N) ratio in an edge center of the cutting tool is lower than the O/(O+N) ratio in a region 100 μm or further away from the edge center in the entire hard coating film.

FIG. 1 schematically shows the structure of a hard coating film according to the present invention. As illustrated in FIG. 1, a coating film made of an oxide and a coating film made of a nitride form a multi-layered structure on the surface of a base material, and in the entire hard coating film, a region portion (a hatched portion) within about 100 μm from the center of an edge (a curved portion in the base material) toward a rake face or a flank face is characterized in that the ratio of oxygen/(oxygen+nitrogen) (hereinafter referred to as O/(O+N)) is controlled to be relatively low compared to that of other regions.

Meanwhile, the ratio of O/(O+N) may be uniformly formed in the region (the hatched portion) within about 100 μm from the center of the edge (the curved portion in the base material) toward the inclined or the flank face, or may be formed in a form in which the ratio of 0/(0+N) gradually increases in a continuous, intermittent, or mixed form from the center toward the rake face or the flank face.

When the O/(O+N) of each of the edge and the rake face or the flank face are controlled to be different from each other, the rake face or the flank face has a relatively high O/(O+N) compared to the edge, and thus has improved oxidation resistance and welding resistance. Meanwhile, the edge has a relatively low O/(O+N), and thus has improved delamination resistance. Through the above, the characteristics of the hard coating film may be controlled according to the physical properties required for each of the rake face (or the flank face) and the edge, so that the lifespan of a cutting tool may be extended.

In addition, in the hard coating film, when the difference between the O/(O+N) of an edge center of the cutting tool and the O/(O+N) of a region 100 μm or further away from the edge center is less than 0.05, the difference in physical properties between the edge and the rake face or the flank face described above may not be sufficient, and when greater than 0.15, the oxidation resistance and welding resistance of the edge become excessively low, which is not desirable, so that it is preferable to maintain the difference in O/(O+N) between 0.05 and 0.15.

In addition, the coating film made of an oxide and the coating film made of a nitride, which constitute the hard coating film, may each be a compound including one or more element selected from Al, Cr, Ti, Y, V, W, Ta, Nb, Mo, Zr, Hf, and Si.

In addition, when the hard coating film is formed thin to have a thickness of less than 0.01 μm, the thickness is too thin for the hard coating film to sufficiently protect the cutting tool, and when the thickness is greater than 20 μm, delamination, chipping, and the like are likely to occur due to increased residual stress, which causes the lifespan of the tool to rather decrease, so that it is preferable that the thickness is formed in the range of 0.01 μm to 20 μm.

In addition, when the sum of thicknesses of the coating films made of an oxide is formed thin to less than 0.01 μm, the oxidation resistance is not sufficient, and when the sum is greater than 5 μm, delamination and chipping are likely to occur due to increased residual stress, and the conductivity of the coating film decreases significantly, thereby decreasing the density and adhesion of the coating film as deposited, so that it is preferable that the sum is formed in the range of 0.01 μm to 5 μm, more preferably 0.01 μm to 3 μm, and most preferably 0.01 μm to 1 μm.

In addition, in upper portions and/or lower portions of the coating film made of an oxide and the coating film made of a nitride, one or more layers of a compound selected from a carbide, a nitride, an oxide, a carbonitride, an oxynitride, an oxycarbide, an oxycarbonitride, a boride, a boron nitride, a boron carbide, a boron carbonitride, a boron oxynitride, a boron oxocarbide, a boron oxocarbonitride, and a boron oxonitride, all of which includes one or more selected from Al, Cr, Ti, Y, V, W, Ta, Nb, Mo, Zr, Hf, and Si, may be additionally formed.

In addition, the coating film made of an oxide may be composed of, for example, $Al_2O_3$ which is composed of a cubic gamma phase or a hexagonal alpha phase.

MODE FOR CARRYING OUT THE INVENTION

Examples

Preparation of Hard Coating Film

In an embodiment of the present invention, a coating film made of an oxide was formed on the surface of a hard base material made of a sintered body such as cemented carbide, cermet, ceramic, or cubic boron nitride using magnetron sputtering, which is a physical vapor deposition (PVD) method, and in addition, a hard coating film having a multi-layered structure including the coating film made of an oxide and a coating film made of a nitride was formed through a hybrid PVD process in which arc ion plating and magnetron sputtering are simultaneously applied.

Specifically, the base material was washed with wet microblasting and ultrapure water, and then mounted in a dried state along the circumference at a position away from a central axis on a rotary table in a coating furnace by a predetermined distance in a radial direction. The initial vacuum pressure in the coating furnace was reduced to $8.5 \times 10^{-5}$ Torr or less, and the temperature was raised to 400° C. to 600° C., and then a pulse bias voltage of −200 V to −300V was applied to the rotating base material while rotating on the rotary table under an Ar gas atmosphere to perform ion bombardment for 30 minutes to 60 minutes. The gas pressure for coating was maintained at 50 mTorr or less, preferably 40 mTorr or less, and a substrate bias voltage during coating was −100 V to −150 V when coating an oxide film and −20 V to −100 V when coating a nitride film. The above coating conditions may vary depending on equipment characteristics and conditions.

More specifically, as the base material, cemented carbide composed of WC having an average particle size of 0.8 μm and Co having a content of 10 wt. % was used. The oxide coating film was made of $Al_2O_3$, and was formed using an Al 99.9 at. % target under the conditions of a bias voltage of −125 V (Pulsed DC, 20 kHz to 45 kHz), a sputter power of 20 kW, injection of $O_2$ and Ar as reaction gases, and a pressure of 0.5 Pa. The nitride coating film was made of AlTiN or AlCrN, and was formed using an AlTi (60 at. %/40 at. %) target or an AlCr (64 at. %/36 at. %) target under the conditions of a bias voltage of −30 V to −60V, an arc current of 100 A to 150 A, injection of $N_2$ as a reaction gas, and a pressure of 2.7 Pa to 4.0 Pa. Here, Examples of the present invention was configured by applying a pulse bias voltage of −200 V to −300V to perform ion bombardment for 5 minutes to 10 minutes immediately after forming the oxide coating film, and Comparative Examples of the present invention was configured by not performing a separate process other than coating immediately after forming the oxide coating film.

Examples and Comparative Examples of the present invention were manufactured under the above conditions, and basic information on the structure, thickness, and hardness of a hard coating film corresponding thereto are shown in Table 1 below.

TABLE 1

| Classification | Number | Thin film structure | $Al_2O_3$ thickness (μm) | Total thickness (μm) | Thin film hardness (GPa) |
|---|---|---|---|---|---|
| Examples | 1-1 | AlTiN/$Al_2O_3$ | 0.4 | 2.6 | 29.2 |
| | 1-2 | AlTiN/$Al_2O_3$/AlTiN | 0.4 | 3.0 | 32.0 |
| | 1-3 | AlCrN/$Al_2O_3$ | 0.4 | 2.7 | 28.8 |
| | 1-4 | AlCrN/$Al_2O_3$/AlCrN | 0.4 | 3.1 | 31.8 |

TABLE 1-continued

| Classification | Number | Thin film structure | $Al_2O_3$ thickness (μm) | Total thickness (μm) | Thin film hardness (GPa) |
|---|---|---|---|---|---|
| Comparative Examples | 2-1 | $AlTiN/Al_2O_3$ | 0.4 | 2.7 | 28.9 |
| | 2-2 | $AlTiN/Al_2O_3/AlTiN$ | 0.4 | 3.0 | 32.2 |
| | 2-3 | $AlCrN/Al_2O_3$ | 0.4 | 2.7 | 29.3 |
| | 2-4 | $AlCrN/Al_2O_3/AlCrN$ | 0.4 | 3.0 | 31.4 |

O/(O+N) Analysis Result of Hard Film

Table 2 below shows the results of analyzing the O/(O+N) in a coating film of an edge center of a cutting tool and the O/(O+N) in a coating film of a region 100 μm away from the edge center for samples of Examples and Comparative Examples using Energy-disperse X-ray spectroscopy (EDX). At this time, in general, a rake face of a tool is placed in a direction parallel to a target, and a flank face of the tool is placed in a direction perpendicular to the target, which may change depending on the shape of the tool or how the tool is mounted on a rotary table. In Sample Nos. 1-2(R), 1-4(R), 2-2(R), and 2-4(R), the tool was mounted on the rotary table such that the rake face of the tool was placed in a direction perpendicular to the target, and the flank face of the tool was placed in a direction parallel to the target.

TABLE 2

| | | | O/(O + N) in thin film | | |
|---|---|---|---|---|---|
| Classification | Number | Thin film structure | Edge center | Rake face | Flank face |
| Examples | 1-1 | $AlTiN/Al_2O_3$ | 0.36 | 0.42 | 0.51 |
| | 1-2 | $AlTiN/Al_2O_3/AlTiN$ | 0.28 | 0.33 | 0.42 |
| | 1-2 (R) | $AlTiN/Al_2O_3/AlTiN$ | 0.30 | 0.45 | 0.35 |
| | 1-3 | $AlCrN/Al_2O_3$ | 0.38 | 0.43 | 0.50 |
| | 1-4 | $AlCrN/Al_2O_3/AlCrN$ | 0.29 | 0.38 | 0.42 |
| | 1-4 (R) | $AlCrN/Al_2O_3/AlCrN$ | 0.27 | 0.43 | 0.34 |
| Comparative Examples | 2-1 | $AlTiN/Al_2O_3$ | 0.46 | 0.42 | 0.45 |
| | 2-2 | $AlTiN/Al_2O_3/AlTiN$ | 0.37 | 0.33 | 0.35 |
| | 2-2 (R) | $AlTiN/Al_2O_3/AlTiN$ | 0.39 | 0.38 | 0.34 |
| | 2-3 | $AlCrN/Al_2O_3$ | 0.46 | 0.42 | 0.45 |
| | 2-4 | $AlCrN/Al_2O_3/AlCrN$ | 0.39 | 0.35 | 0.38 |
| | 2-4 (R) | $AlCrN/Al_2O_3/AlCrN$ | 0.38 | 0.36 | 0.33 |

As confirmed in Table 2 above, in the hard coating films of Examples, the O/(O+N) in the coating film in the edge center of the cutting tool had a lower value than that of the O/(O+N) in the coating film in the region 100 μm away from the edge center of the cutting tool (a rake face or a flank face) by 0.05 to 0.15. On the contrary, in the hard coating films of Comparative Examples, the O/(O+N) in the coating film in the edge center of the cutting tool had a higher value than that of the O/(O+N) in the coating film in the region 100 μm away from the edge center of the cutting tool (a rake face or a flank face) by 0.01 to 0.07. That is, the hard coating film of each of Examples has a low O/(O+N) in the coating film in the edge center of the cutting tool, and has a more significant O/(O+N) difference depending on the position of the edge.

Evaluation of Cutting Performance

In order to evaluate the welding resistance, delamination resistance, and chipping resistance of the hard coating films prepared as shown in Table 2, a milling test was performed, and the evaluations were performed under the following conditions.

When carbon steel is machined at a low cutting speed, the welding resistance of a rake face has a great effect on the cutting performance due to the welding of a material to be cut and the resulting built-up edge of a tool. When stainless steel is machined under the condition of finishing, which is a finish machining with a cutting depth of 1 mm or less, strain hardening is concentrated on an edge portion, so that the delamination resistance of the edge portion has a great influence on cutting performance. As for mold steel, mechanical frictional abrasion is the main type of abrasion, but due to frequent chipping, the chipping resistance an edge portion also has a great influence on cutting performance, as much as the abrasion resistance thereof does, in order to allow a tool to fully exert its original abrasion resistance.

(1) Evaluation of Welding Resistance
 Material to be cut: Carbon Steel (SM45C)
 Sample model number: SDKN1504AESN-SU
 Cutting speed: 150 m/min
 Cutting feed: 0.2 mm/tooth
 Cutting depth: 2 mm
(2) Evaluation of Delamination Resistance
 Material to be cut: Stainless steel (STS316L)
 Sample model number: SNMX1206ANN-MF
 Cutting speed: 120 m/min
 Cutting feed: 0.1 mm/tooth
 Cutting depth: 1 mm
(3) Evaluation of Chipping Resistance
 Material to be cut: Mold steel (NAK80)
 Sample model number: ADKT170608PESR-MM
 Cutting speed: 100 m/min
 Cutting feed: 0.15 mm/tooth
 Cutting depth: 5 mm The evaluation results obtained under the above conditions are shown in Table 3 below.

TABLE 3

| | | Welding resistance | | Delamination resistance | | Chipping resistance | |
|---|---|---|---|---|---|---|---|
| Classifications | Number | Machining length (mm) | Wear type | Machining length (mm) | Wear type | Machining length (mm) | Wear type |
| Examples | 1-1 | 3000 | Thin film tearing | 500 | Boundary chipping | 900 | R portion chipping |
| | 1-2 | 5400 | Normal wear | 1500 | Normal wear | 2100 | Normal wear |

TABLE 3-continued

| Classifications | Number | Welding resistance Machining length (mm) | Wear type | Delamination resistance Machining length (mm) | Wear type | Chipping resistance Machining length (mm) | Wear type |
|---|---|---|---|---|---|---|---|
| | 1-2 (R) | 6300 | Normal wear | 1800 | Normal wear | 1800 | Normal wear |
| | 1-3 | 3600 | Welding | 400 | Boundary chipping | 1200 | Excessive wear |
| | 1-4 | 6300 | Normal wear | 1200 | Normal wear | 2400 | Normal wear |
| | 1-4 (R) | 7500 | Normal wear | 1200 | Normal wear | 1800 | Normal wear |
| Comparative Examples | 2-1 | 3300 | Thin film tearing | 400 | Boundary chipping | 600 | Damaged |
| | 2-2 | 4200 | Welding | 800 | Boundary chipping | 1200 | R portion chipping |
| | 2-2 (R) | 4200 | Welding | 1000 | Boundary chipping | 600 | Damaged |
| | 2-3 | 3900 | Welding | 300 | Sudden breakage | 900 | R portion chipping |
| | 2-4 | 4800 | Welding | 700 | R portion chipping | 1800 | R portion chipping |
| | 2-4 (R) | 5200 | Welding | 700 | Boundary chipping | 1200 | R portion chipping |

As confirmed in Table 3 above, 1-2, 1-2(R), 1-4, and 1-4 (R) among the hard coating films of Examples have excellent welding resistance, delamination resistance, and chipping resistance compared to the hard coating films of Comparative Examples.

The hard coating films of Examples have a structure in that delamination resistance and chipping resistance of the edge portion are excellent since the O/(O+N) of the edge center is lower than that of the rake face or the flank face, and oxidation resistance and welding resistance are excellent since the O/(O+N) of the rake face or the flank face is high. For the above reason, the hard coating films of Example have better physical properties required for each part of the tool compared to the hard coating films of Comparative Examples, and thus, are determined to have excellent cutting performance in the milling test.

Here, in the case of 1-1 and 2-1 samples having a two-layered structure of a nitride coating film and an oxide coating film, the oxide coating film is quickly consumed during machining due to a low thin film hardness, a small thin film thickness, and the absence of an outermost layer to protect the oxide coating film, and accordingly, oxidation resistance and welding resistance are reduced, resulting in relatively low cutting performance. Therefore, it can be seen that it is structurally stable when oxide coating films are stacked between nitride coating films as in the samples 1-2, 1-4, 2-2, and 2-4, and when there is an O/(O+N) difference for each part of the tool as in the samples 1-2 and 1-4, it is determined to be a thin film structure which may best reflect the resulting effect of improving cutting performance.

In addition to the 12 samples evaluated above, a hard coating film sample having a nitride coating film including one or more selected from Al, Cr, Ti, Y, V, W, Ta, Nb, Mo, Zr, Hf, and Si on an upper and/or a lower portion of a coating film made of an oxide was additionally prepared. A milling test was performed on the sample, and the evaluation results are shown in Table 4 below.

TABLE 4

| Classifications | Number | Thin film structure | Welding resistance Machining length (mm) | Delamination resistance Machining length (mm) | Chipping resistance Machining length (mm) |
|---|---|---|---|---|---|
| Examples | 3-1 | AlTiN/Al$_2$O$_3$/AlTiSiN (Al:Ti:Si = 57:38:5) | 6600 | 1500 | 3000 |
| | 3-2 | AlTiN/Al$_2$O$_3$/AlTiVZrN (Al:Ti:V:Zr = 54:36:5:5) | 7200 | 2100 | 2400 |
| | 3-3 | AlTiN/Al$_2$O$_3$/AlTiNbMoN (Al:Ti:Nb:Mo = 54:36:5:5) | 6300 | 1500 | 2700 |
| | 3-4 | AlTiWYN/Al$_2$O$_3$/AlTiN (Al:Ti:W:Y = 56.4:37.6:3:3) | 5400 | 1800 | 2400 |
| | 3-5 | AlTiTaHfN/Al$_2$O$_3$/AlTiN (Al:Ti:Ta:Hf = 56.4:37.6:3:3) | 5700 | 1200 | 2100 |
| | 3-6 | AlCrN/Al$_2$O$_3$/AlCrSiN (Al:Cr:Si = 60.8:34.2:5) | 8400 | 1800 | 3900 |
| | 3-7 | AlCrN/Al$_2$O$_3$/AlCrVZrN (Al:Cr:V:Zr = 57.6:32.4:5:5) | 8100 | 1800 | 3000 |
| | 3-8 | AlCrN/Al$_2$O$_3$/AlCrNbMoN (Al:Cr:Nb:Mo = 57.6:32.4:5:5) | 6000 | 1200 | 3000 |

TABLE 4-continued

| Classifications | Number | Thin film structure | Welding resistance Machining length (mm) | Delamination resistance Machining length (mm) | Chipping resistance Machining length (mm) |
|---|---|---|---|---|---|
| | 3-9 | AlCrWYN/Al$_2$O$_3$/AlCrN (Al:Cr:W:Y = 60.2:33.8:3:3) | 6300 | 2100 | 2700 |
| | 3-10 | AlCrTaHfN/Al$_2$O$_3$/AlCrN (Al:Cr:Ta:Hf = 60.2:33.8:3:3) | 6900 | 1200 | 2400 |
| Comparative Examples | 4-1 | AlTiN/Al$_2$O$_3$/AlTiSiN (Al:Ti:Si = 57:38:5) | 2700 | 1200 | 1800 |
| | 4-2 | AlTiN/Al$_2$O$_3$/AlTiVZrN (Al:Ti:V:Zr = 54:36:5:5) | 3600 | 1200 | 1500 |
| | 4-3 | AlTiN/Al$_2$O$_3$/AlTiNbMoN (Al:Ti:Nb:Mo = 54:36:5:5) | 2700 | 1200 | 1500 |
| | 4-4 | AlTiWYN/Al$_2$O$_3$/AlTiN (Al:Ti:W:Y = 56.4:37.6:3:3) | 2700 | 900 | 1200 |
| | 4-5 | AlTiTaHfN/Al$_2$O$_3$/AlTiN (Al:Ti:Ta:Hf = 56.4:37.6:3:3) | 3000 | 900 | 900 |
| | 4-6 | AlCrN/Al$_2$O$_3$/AlCrSiN (Al:Cr:Si = 60.8:34.2:5) | 4200 | 900 | 2100 |
| | 4-7 | AlCrN/Al$_2$O$_3$/AlCrVZrN (Al:Cr:V:Zr = 57.6:32.4:5:5) | 4800 | 1500 | 2100 |
| | 4-8 | AlCrN/Al$_2$O$_3$/AlCrNbMoN (Al:Cr:Nb:Mo = 57.6:32.4:5:5) | 4200 | 900 | 1800 |
| | 4-9 | AlCrWYN/Al$_2$O$_3$/AlCrN (Al:Cr:W:Y = 60.2:33.8:3:3) | 4200 | 1500 | 1500 |
| | 4-10 | AlCrTaHfN/Al$_2$O$_3$/AlCrN (Al:Cr:Ta:Hf = 60.2:33.8:3:3) | 3900 | 1200 | 1500 |

As confirmed in Table 4 above, the hard coating films of Examples generally have excellent welding resistance, delamination resistance, and chipping resistance compared to the hard coating films of Comparative Examples.

It can be seen that the hard coating film having a nitride coating film including one or more selected from Al, Cr, Ti, Y, V, W, Ta, Nb, Mo, Zr, Hf, and Si on an upper and/or a lower portion of a coating film made of an oxide had slightly different cutting performance for each evaluation item according to the composition and the stacking position of the nitride. As described above, through the compositional and structural combination of various materials in a coating film composed of an oxide and a nitride of the present invention, it can be expected to design a hard coating film suitable for a machining environment and to improve performance accordingly.

The invention claimed is:

1. A hard coating film formed in a multi-layered structure on a base material of a cutting tool, wherein:
    the hard coating film includes one or more layers of a coating film made of an oxide and one or more layers of a coating film made of a nitride; and
    in the entire hard coating film, an O/(O+N) ratio in an edge center of the cutting tool is lower than an O/(O+N) ratio in a region 100 μm or further away from the edge center by 0.05 to 0.15.

2. The hard coating film of claim 1, wherein the coating film made of an oxide and the coating film made of a nitride comprise one or more selected from Al, Cr, Ti, Y, V, W, Ta, Nb, Mo, Zr, Hf, and Si.

3. The hard coating film of claim 1, wherein:
    the total thickness of the hard coating film is 0.02 μm to 20 μm; and
    the total thickness of all oxide films included in the hard coating film is 0.01 μm to 5 μm.

4. The hard coating film of claim 1, wherein in upper portions and/or lower portions of the coating film made of an oxide and the coating film made of a nitride, one or more layers of a compound selected from a carbide, a nitride, an oxide, a carbonitride, an oxynitride, an oxycarbide, an oxycarbonitride, a boride, a boron nitride, a boron carbide, a boron carbonitride, a boron oxynitride, a boron oxocarbide, a boron oxocarbonitride, and a boron oxonitride, all of which includes one or more selected from Al, Cr, Ti, Y, V, W, Ta, Nb, Mo, Zr, Hf, and Si, are formed.

5. The hard coating film of claim 1, wherein the coating film made of an oxide is composed of Al$_2$O$_3$, which is composed of a cubic gamma phase or a hexagonal alpha phase.

* * * * *